(12) United States Patent
Chou

(10) Patent No.: US 9,945,369 B2
(45) Date of Patent: Apr. 17, 2018

(54) AIR COMPRESSOR WITH IMPROVED ROTATING DEVICE

(71) Applicant: Wen-San Chou, Tainan (TW)

(72) Inventor: Wen-San Chou, Tainan (TW)

( * ) Notice: Subject to any disclaimer, the term of this patent is extended or adjusted under 35 U.S.C. 154(b) by 367 days.

(21) Appl. No.: 14/706,974

(22) Filed: May 8, 2015

(65) Prior Publication Data

US 2015/0330379 A1 Nov. 19, 2015

(30) Foreign Application Priority Data

May 15, 2014 (TW) .............................. 103117181 A

(51) Int. Cl.
| | | |
|---|---|---|
| *F04B 39/00* | (2006.01) | |
| *F16C 3/30* | (2006.01) | |
| *F04B 39/14* | (2006.01) | |
| *F16F 15/26* | (2006.01) | |
| *F04B 35/04* | (2006.01) | |
| *F04B 39/12* | (2006.01) | |

(52) U.S. Cl.
CPC ...... *F04B 39/0027* (2013.01); *F04B 39/0022* (2013.01); *F04B 39/0094* (2013.01); *F04B 39/14* (2013.01); *F16C 3/30* (2013.01); *F16F 15/262* (2013.01); *F04B 35/04* (2013.01); *F04B 39/122* (2013.01); *Y10T 74/2183* (2015.01)

(58) Field of Classification Search
CPC .. F04B 35/04; F04B 39/0022; F04B 39/0027; F04B 39/0094; F04B 39/122; F04B 39/14; F16C 3/30; F16F 15/262; Y10T 74/2183

See application file for complete search history.

(56) References Cited

U.S. PATENT DOCUMENTS

| | | | | |
|---|---|---|---|---|
| 5,655,887 A | * | 8/1997 | Chou ...................... | F04B 35/04 417/415 |
| 6,135,725 A | * | 10/2000 | Chou ...................... | F04B 35/04 417/360 |

* cited by examiner

*Primary Examiner* — Logan Kraft

(57) ABSTRACT

An air compressor includes a rotating device pivotally connected to a piston body. The rotating device includes a gear body and a counterweight. The gear body is formed together with a counterweight, wherein the counterweight is provided with a crankshaft corresponding to the center of the gear body and a crankpin placed at a distance from the crankshaft. The counterweight is horizontally divided into two integrally formed halves, including a left half and a right half, with a common line connected between the center of the crankshaft and the center of the crankpin, wherein the left half has a weight different from the right half, so that the piston body gathers more rotational momentum from the counterweight at BDC to facilitate upstrokes, so that the piston body can conduct reciprocating motion more smoothly, and thus the service life of the air compressor can be increased.

10 Claims, 10 Drawing Sheets

AIR COMPRESSOR WITH IMPROVED ROTATING DEVICE

(a) TECHNICAL FIELD OF THE INVENTION

The present invention relates to an air compressor and, more particularly, to an air compressor with a rotating device pivotally connected to a piston body, wherein the rotating device includes a gear body and a counterweight, wherein the counterweight is horizontally divided into two integrally formed halves, including a left half and a right half, the left half having a weight different from the right half, so that the piston body will gather more rotational momentum from the counterweight at BDC to facilitate upstrokes, so that the piston body can conduct reciprocating motion more smoothly, and thus the service life of the air compressor can be increased.

(b) DESCRIPTION OF THE PRIOR ART

Generally, an air compressor employs a motor to drive a piston to conduct reciprocating motion along the inner space of a cylinder. The air being compressed by the piston can be transferred to an air storage tank. The air storage tank is provided with one or more outlets, which can be installed with functional elements, such as a safety valve or relief valve, or connected with a hose to allow the compressed air to be delivered to an application object, such as a tire with an air nozzle.

The motor can drive a gear set to have the piston body conduct reciprocating motion along the inner space of a cylinder. The gear set generally includes a pinion and a gear engaged with the pinion. The piston body cooperates with a counterweight, a crankshaft, and a crankpin to conduct reciprocating motion. Conventionally, the counterweight is a symmetric structure and usually attached to the gear by bolts or other engagement means. For effectively compressing the air within the inner space of the cylinder, the top surface of the piston body should be placed at a right angle with the motion direction of the piston body to optimize the gas-tightness between the cylinder and the piston body. However, the motion resistance is great, and thus the performance and service life of the air compressor is compromised.

The applicant has been dedicated to developing air compressors for a long time. At the early days, the applicant successfully converted a complicated air compressor into an air compressor that is simple in structure and can be quickly assembled. The applicant also successfully modified an air compressor to be a well-performed device. To solve the foregoing disadvantage of the conventional air compressor, the applicant has contrived an air compressor with an improved rotating device pivotally connected to a piston body. The rotating device is formed by a gear body and a counterweight, wherein the counterweight is horizontally divided into a left half and a right half, with a common line therebetween. The left half has a weight different from the right half, so that the piston body will gather more rotational momentum from the counterweight at BDC (bottom dead center) to facilitate upstrokes, so that the piston body can conduct reciprocating motion more smoothly, and thus the service life of the air compressor can be increased.

SUMMARY OF THE INVENTION

One object of the present invention is to provide an air compressor with a rotating device pivotally connected to a piston body, the rotating device including a gear body and a counterweight, wherein the counterweight is provided with a central axle corresponding to the center of the gear body and a crankpin placed at a distance from the central axle, so that the gear body and the counterweight rotates about the central axle; the counterweight is horizontally divided into two integrally formed halves, including a left half and a right half, with a common line connected between the center of the central axle and the center of the crankpin, the left half having a weight different from the right half, whereby the piston body will gather more rotational momentum from the counterweight at BDC to facilitate upstrokes, so that the piston body can conduct reciprocating motion more smoothly, and thus the service life of the air compressor can be increased.

Another object of the present invention is to provide a rotating device including a plastic gear body, a metallic counterweight, and a metallic crankpin, wherein the plastic gear body is formed by plastic molding process together with the metallic counterweight and crankpin, whereby the metallic counterweight is firmly embedded in the plastic gear body, and the metallic crankpin is firmly attached to the plastic gear body.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
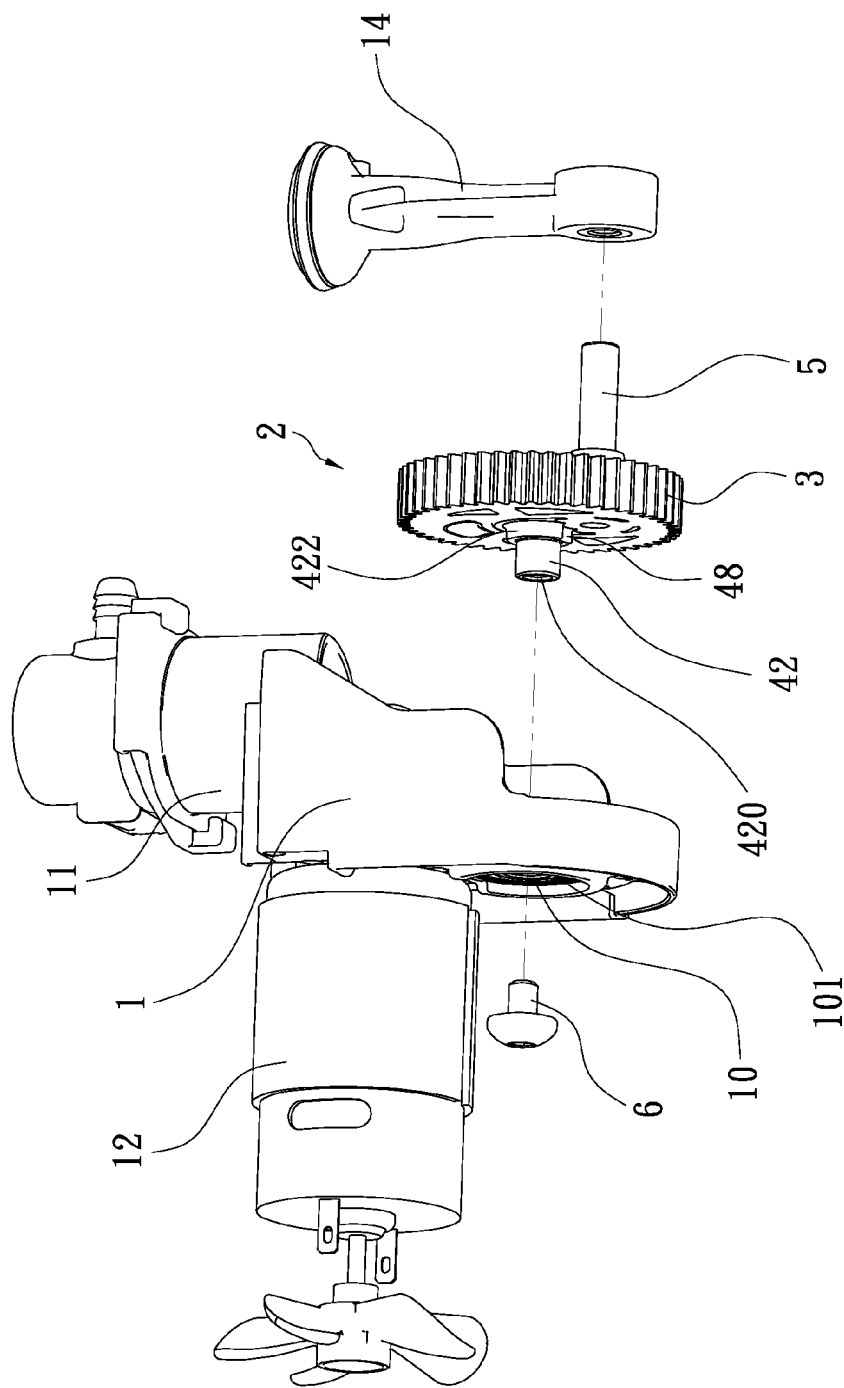
FIG. 1 shows an exploded view of an air compressor according to one embodiment of the present invention.
Figure 2:
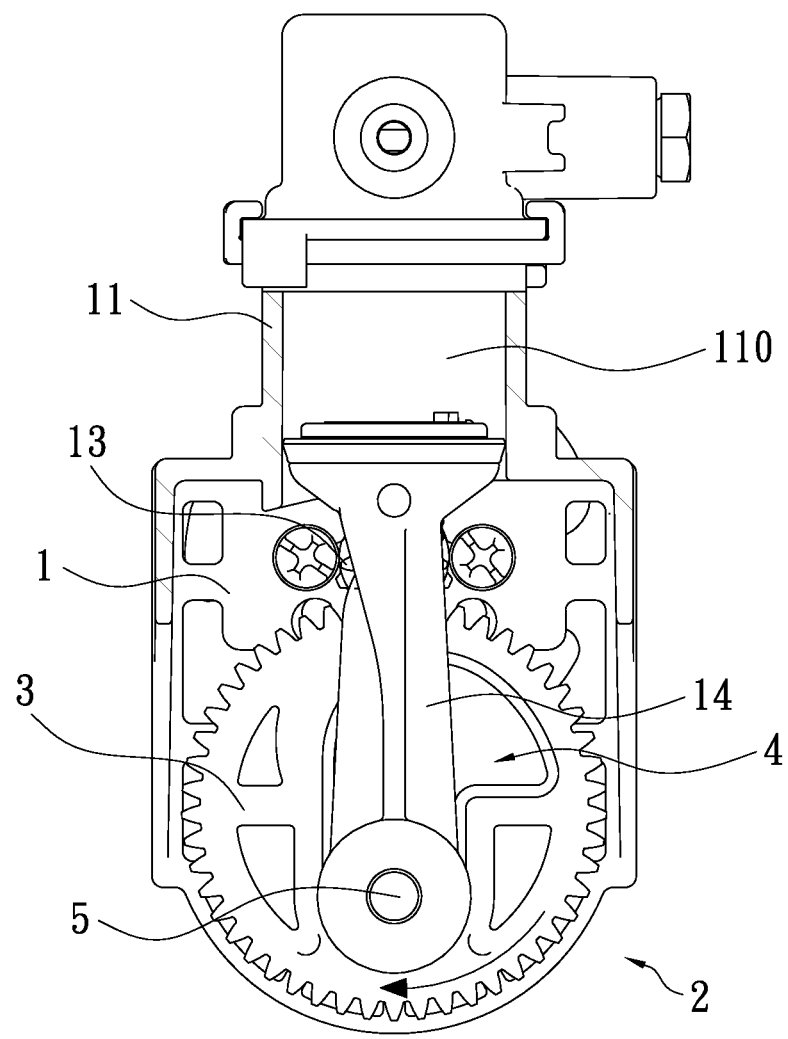
FIG. 2 shows a front view of the air compressor of the embodiment of the present invention.
Figure 3:
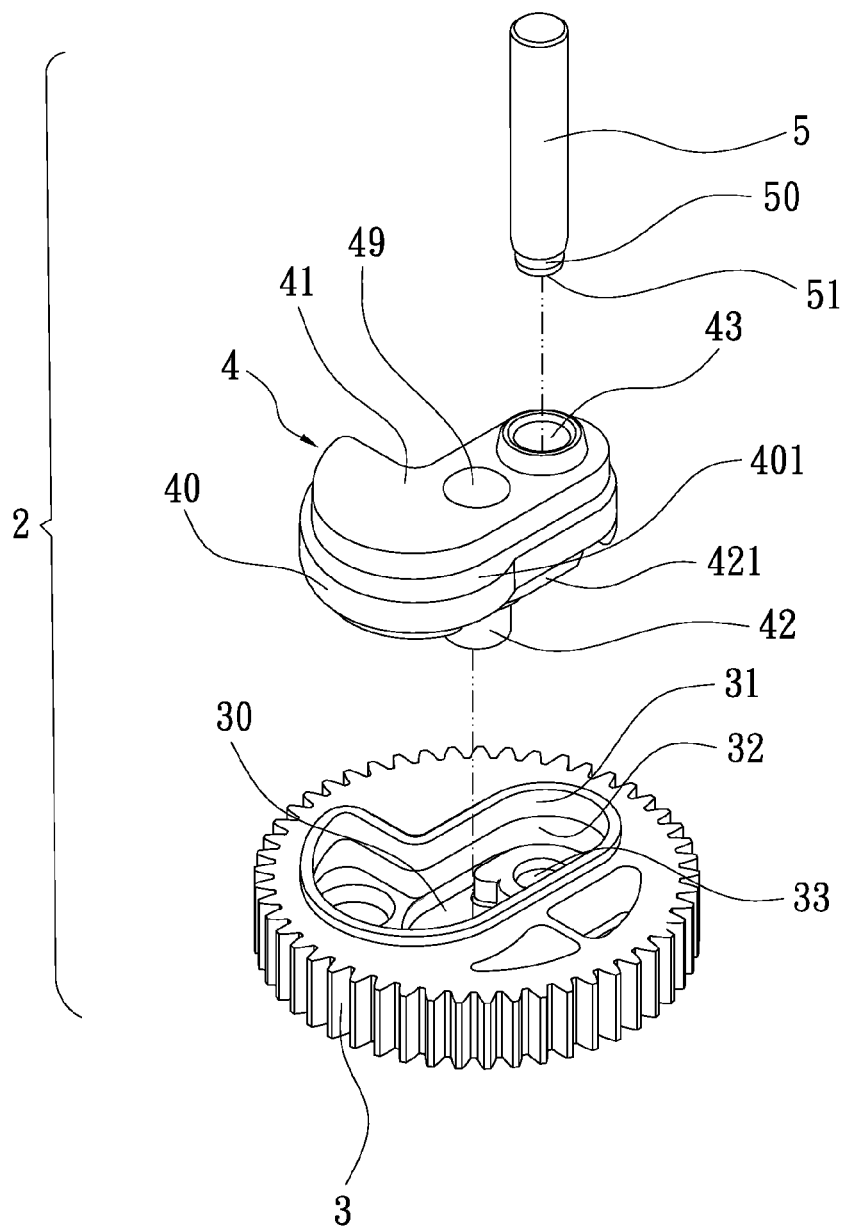
FIG. 3 shows an exploded view of a first embodiment of a rotating device used in the air compressor of the present invention.

Referring to FIGS. 1 through 3, an air compressor with a first embodiment of a rotating device 2 is shown. The air compressor generally comprises a main frame 1, a cylinder 11 fitted with a piston body 14 and provided at the main frame 1, and a motor 12 mounted to the main frame 1. The motor 12 is fitted with a pinion 13 at its output axle, and the pinion 13 is engaged with the rotating device 2, so that the motor 12 can drive the rotating device 2 to have the piston body 14 conduct reciprocating motion along the inner space 110 of the cylinder 11.

Figure 5:
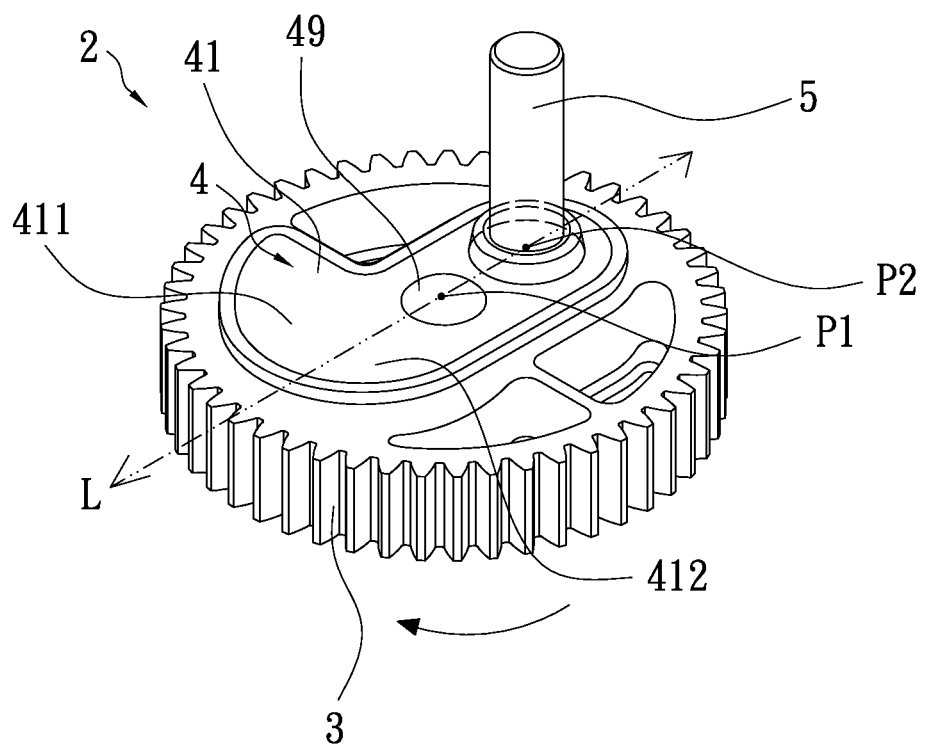
FIG. 5 shows a 3-dimensional view of the first embodiment of the rotating device used in the air compressor of the present invention.

The rotating device 2 includes a gear body 3 that is assembled with a counterweight 4 provided with a central axle (i.e., crankshaft) 42 corresponding to the center (P1) of the gear body 3 and a crankpin 5 placed at a distance from the central axle 42, the center of crankpin 5 being indicated by (P2)(see FIG. 5). In other words, the central axle 42 is located at the central hub 49 of the rotating device 2, so that the gear body 3 and the counterweight 4 will rotate about the center (P1) of the central axle 42. More specifically, the central axle 42 is a hollow axle defining therein a threaded hole 420. The gear body 3 defines a central through hole 30. The counterweight 4 and the crankpin 5 are made of metal. The gear body 3 is formed by plastic molding process together with the metallic counterweight 42 and the crankpin 5, so that the rotating device 2 is produced. The central axle 42 extends out of the central through hole 30 of the gear body 3 to be mounted to the axle hole 10 of a bearing 101 provided at the main frame 1, so that the rotating device 2 can rotate about the axle hole 10 of the bearing 101 of the main frame 1. The counterweight 4 is horizontally divided into two integrally formed halves, including a left half 411 and a right half 412, with a common line (L) connected between the center (P1) of the central axle 42 and the center (P2) of the crankpin 5, wherein the left half 411 has a weight different from the right half 412. In this embodiment, the rotating device 2 is configured to rotate clockwise, and the left half 411 has a weight greater than the right half 412. As such, the piston body 14 can gather more rotational momentum from the counterweight 4 at BDC (bottom dead center) to facilitate upstrokes, so that the piston body 14 can conduct reciprocating motion more smoothly. On the other hand, if the rotating device 2 is configured to rotate counterclockwise, the right half 412 will have a weight greater than the left half 411, so that the piston body 14 can gather more rotational momentum from the counterweight 4 at BDC (bottom dead center) to facilitate upstrokes.

Figure 4:
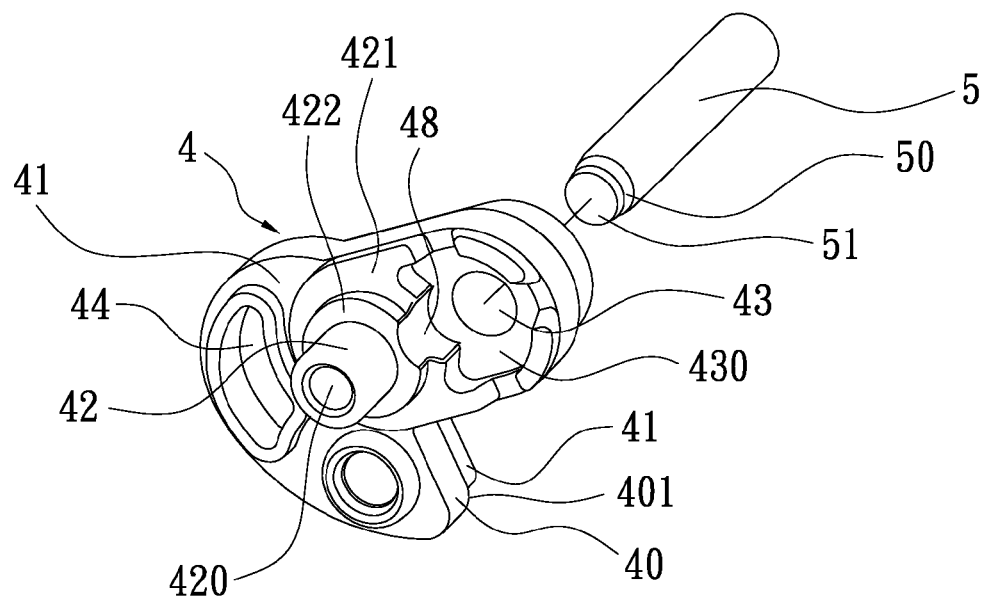
FIG. 4 shows an exploded view of a counterweight and a crankpin used in the first embodiment of the rotating device of the air compressor of the present invention.
Figure 6:
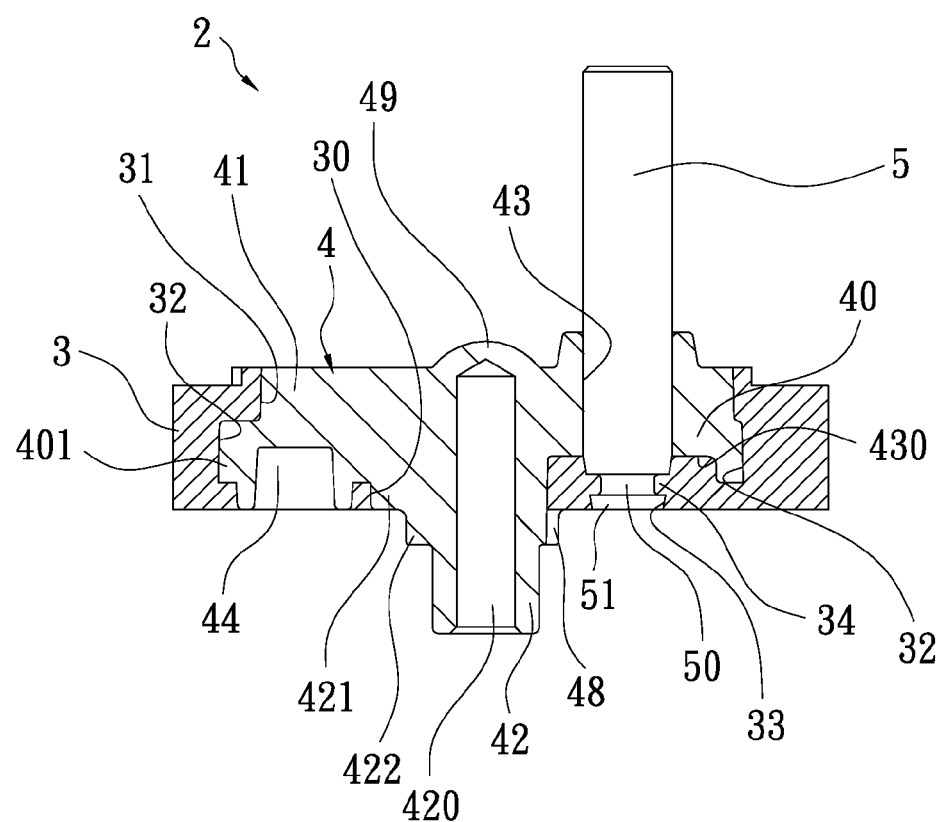
FIG. 6 shows a sectional view of the first embodiment of the rotating device used in the air compressor of the present invention.
Figure 7:
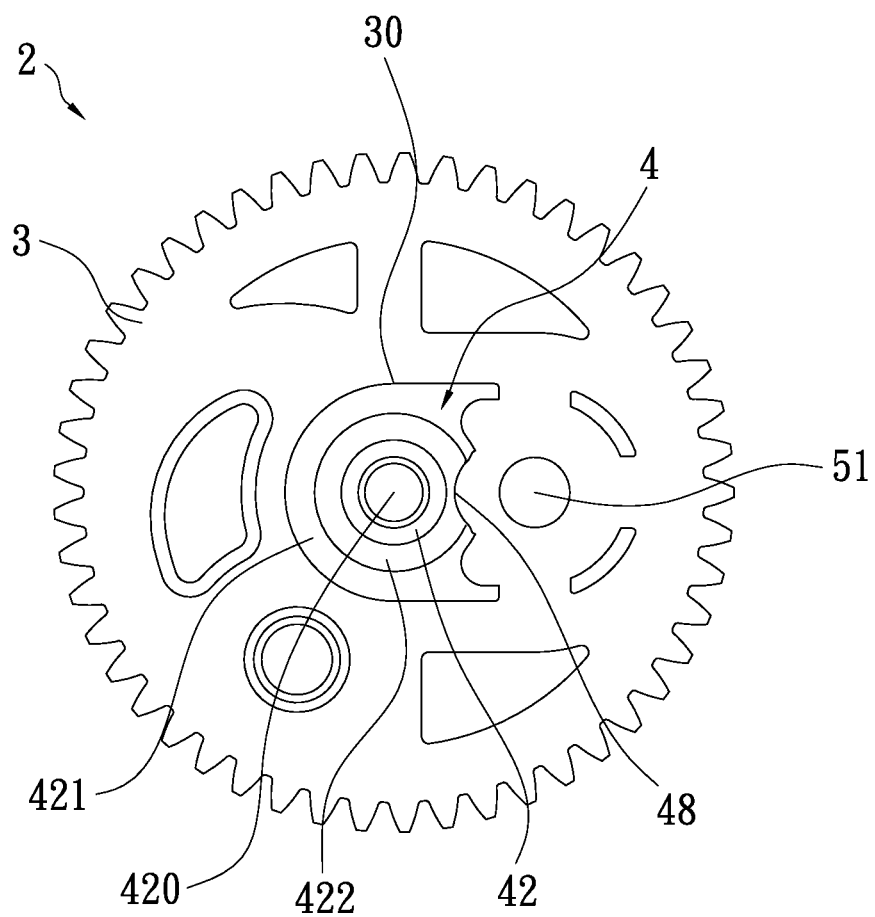
FIG. 7 shows a bottom view of the first embodiment of the rotating device used in the air compressor of the present invention.

As shown in FIGS. 3, 4 and 7, the counterweight 4 is vertically divided into two integrally formed portions, including an upper portion 41 and a lower portion 40, wherein the lower portion 40 has a dimension greater than the upper portion 41 to form an extension 401 beyond the upper portion 41. Furthermore, the counterweight 4 is provided at the bottom of the lower portion 40 with two integrally formed steps, including a first step 421 and a second step 422, wherein the first step 421 is formed on the bottom of the lower portion 40, and the second step 422 is formed on the first step 421. The central axle 42 is formed on the second step 422. The counterweight 4 defines at the bottom of the lower portion 40 a first recess 430 next to the central axle 42 and defines a first through hole 43 at the bottom of the first recess 430. Furthermore, the first and second steps 421, 422 define a curved recess 48 facing towards the first recess 430. More specifically, the gear body 3 defines therein an integral space, including an upper inner space 31 and a lower inner space 32, wherein the upper inner space 31 corresponds to the upper portion 41 of the counterweight 4, whereas the lower inner space 32 corresponds to the lower portion 40 of the counterweight 4. The central through hole 30 is defined at the bottom of the lower inner space 32 and corresponds to the first step 421 of the counterweight 4. Furthermore, the gear body 3 defines at the bottom of the lower inner space 32 a second through hole 33 to be aligned with the first through hole 43 of the counterweight 4, so that the crankpin 5 can be fitted into the first and second through holes 43, 33. The counterweight 4 can be assembled into and formed together with the gear body 3 by mating the upper portion 41, the lower portion 40, and the first step 421 of the counterweight 4 respectively with the upper inner space 31, the lower inner space 32, and the central through hole 30 of the gear body 3. The second step 422 and the central axle 42 of the counterweight 4 extends out of the central through hole 30 of the gear body 3 (see FIG. 6), so that the central axle 42 can be mounted to the axle hole 10 of the bearing 101 of the main frame 1.

More specifically, the inner surface of the second through hole 33 of the gear body 3 is provided with an annular protrusion 34, while the crankpin 5 defines an annular groove 50 at its one end 51, corresponding to the annular protrusion 34 provided in the second through hole 33 of the gear body 3. The annular protrusion 34 of the gear body 3 can be engaged with the annular groove 50 of the crankpin 5. The crankpin 5 is fitted such that the end adjacent to the annular groove 50 is in flush with the bottom of the gear body 3, while the other end of the crankpin 5 extends out of the first through hole 43 of the counterweight 4 to be pivotally connected to the piston body 14.

As described above, the rotating device 2 includes the gear body 3 and the counterweight 4, wherein the metallic counterweight 4 is heavier than the plastic gear body 3. The rotating device 2 can be manufactured by plastic molding process, wherein the metallic counterweight 4 and crankpin 5 can be placed in a molding cavity to allow them to be integrally formed with the plastic gear body 3. As such, the counterweight 4 can be firmly embedded in the gear body 3, and the crankpin 5 can be firmly attached to the gear body 3.

As shown in FIG. 5, one of primary features is that the counterweight 4 is horizontally divided into the left half 411 and the right half 412, with a common line (L) therebetween, wherein the left half 411 has a weight different from the right half 412. In this embodiment, the rotating device 2 is configured to rotate clockwise, and the left half 411 has a weight greater than the right half 412. The central axle 42 of the counterweight 4 extends out of the central through hole 30 of the gear body 3, wherein the central axle 42 can be mounted to the axle hole 10 of the bearing 101 provided at the main frame 1 and fixed by a bolt 6 threaded into the threaded hole 420 of the central axle 42, so that the rotating device 2 can rotate about the axle hole 10 of the bearing 101 of the main frame 1 (see FIG. 1).

The feature of the left half 411 having a different weight from the right half 412 can be achieved by configuring the two halves 411, 412 with asymmetric shapes, as shown in FIG. 5, wherein the left half 411 and the right half 412 are asymmetric about the common line (L). In this embodiment, the rotating device 2 is configured to rotate clockwise, and the left half 411 has a dimension greater than the right half 412. On the other hand, if the rotating device 2 is configured to rotate counterclockwise, the right half 412 will have a dimension greater than the left half 411. In operation, since the pinion 13 is engaged with the gear body 3 of the rotating device 2, the rotating device 2 can be rotated by the pinion 13 to have the piston body 14 conduct reciprocating motion along the inner space 110 of the cylinder 11 (see FIG. 2), wherein the piston body 14 can gather more rotational momentum from the counterweight 4 at BDC (bottom dead center) to facilitate upstrokes, so that the piston body 14 can conduct reciprocating motion more smoothly, and thus the service life of the air compressor can be increased.

The feature of the left half 411 having a different weight from the right half 412 can be also achieved by defining a second recess 44 at the bottom of the lower portion 40 of the counterweight 4 (see FIG. 4). In this embodiment, the rotating device 2 is configured to rotate clockwise, and the second recess 44 is substantially at the right half 412 of the counterweight 4. The more the area of the second recess 44 becomes, the less the weight of the right half 412 becomes. Thus, the left half 411 has a weight greater than the right half 412, so that piston body 14 will gather more rotational momentum from the counterweight 4 at BDC (bottom dead center) to facilitates upstrokes. On the other hand, if the rotating device 2 is configured to rotate counterclockwise, the second recess 44 is substantially defined at the left half 411 of the counterweight 4, so that the right half 412 will have a weight greater than the left half 411 to facilitate upstrokes of the piston body 14.

In operation, although the top surface of the piston body 14 being perpendicular to the central axis of the cylinder 11 achieves an excellent gas-tight effect and thus enables the piston body 14 to effectively compress air within the cylinder 11, the resistance during upstrokes is great. With the rotating device 2 of the present invention, the piston body 14 can easily go past BDC to conduct reciprocating motion more smoothly, and thus the service life of the air compressor can be increased.

Figure 8:
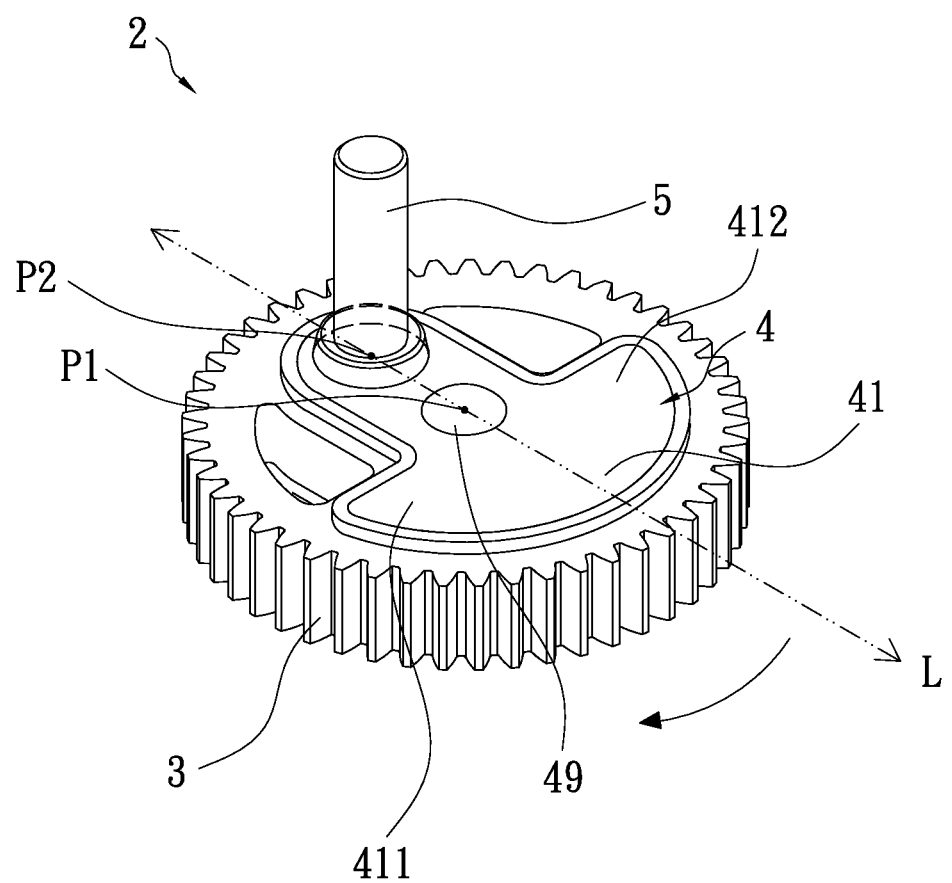
FIG. 8 shows a 3-dimensional view of a second embodiment of the rotating device used in the air compressor of the present invention.
Figure 9:
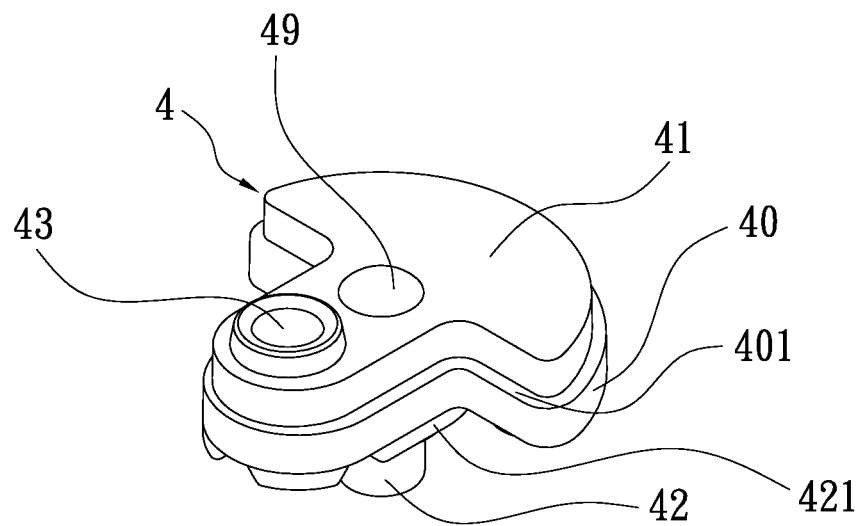
FIG. 9 shows a 3-dimensional view of a counterweight together with a crankpin used in the second embodiment of the rotating device.
Figure 10:
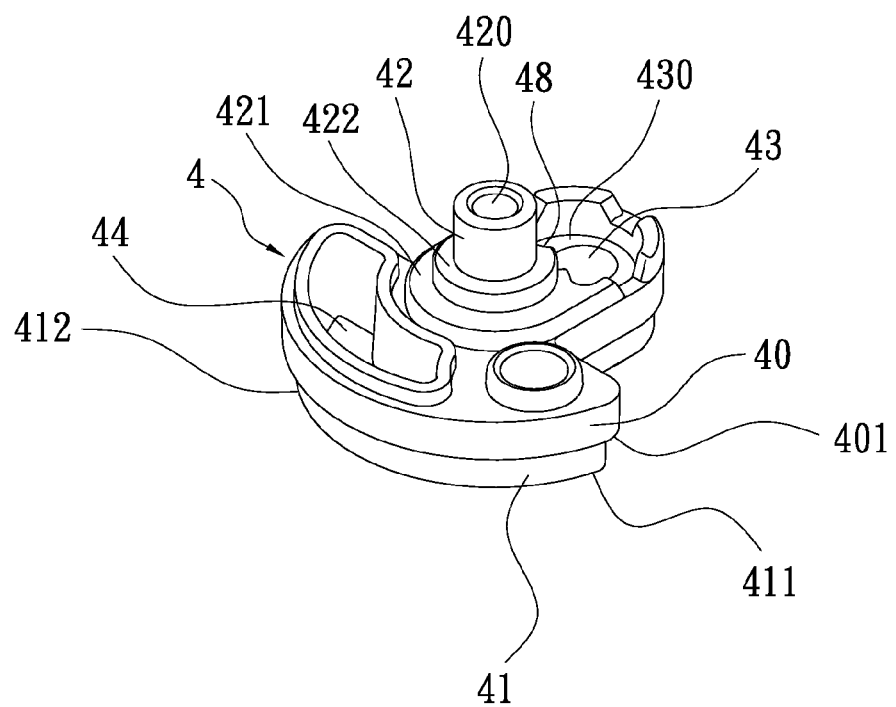
FIG. 10 shows another 3-dimensional view of the counterweight together with the crankpin used in the second embodiment of the rotating device.

FIGS. 8, 9 and 10 show a second embodiment of the rotating device used in the present invention, wherein the rotating device 2 is configured to rotate clockwise, and the counterweight 4 is horizontally divided into two symmetrical halves 411, 412, with a common line (L) connected between the rotational center (P1) of the rotating device 2 and the center (P2) of the crankpin 5; a second recess 44 is defined at the bottom of the lower portion 40, substantially at the right half 412, so that the left half 411 is heavier than the right half 412 (see FIG. 10). Thus, the piston body 14 will gather more rotational momentum from the counterweight 4 at BDC (bottom dead center) to facilitate upstrokes, so that the piston body 14 can conduct reciprocating motion more smoothly and thus the service life of the air compressor can be increased. On the other hand, if the rotating device 2 is configured to rotate counterclockwise, the second recess 44 is substantially defined at the left half 411 of the counterweight 4, so that the right half 412 has a weight greater than the left half 411 to facilitate upstrokes of the piston body 14.

As a summary, the present invention provides an air compressor with a rotating device 2 pivotally connected to a piston body 14. The rotating device 2 is formed by the gear body 3 and counterweight 4. The counterweight 4 is horizontally divided into a left half 411 and a right half 412, with a common line (L) therebetween, wherein the left half 411 has a weight different from the right half 412, so that the piston body 14 will gather more rotational momentum form the counterweight 4 at BDC (bottom dead center) to facilitate upstrokes, so that the piston body 14 can conduct reciprocating motion more smoothly, and thus the service life of the air compressor can be increased.

I claim:

1. In an air compressor including a main frame provided with a cylinder and a motor, the cylinder being fitted with a piston body, the motor capable of driving a rotating device to have the piston body conduct reciprocating motion in the cylinder, the rotating device including a gear body that is assembled with a counterweight provided with a central axle corresponding to the center of the gear body and a crankpin placed at a distance from the central axle, so that the gear body and the counterweight rotates about the central axle, wherein the improvement comprises:
the counterweight is horizontally divided into two integrally formed halves, including a left half and a right half, with a common line connected between the center of the central axle and the center of the crankpin, the left half having a weight different from the right half, whereby the piston body will gather more rotational momentum from the counterweight at BDC to facilitate upstrokes, so that the piston body can conduct reciprocating motion more smoothly.

2. The air compressor of claim 1, wherein the counterweight and the crankpin are made of metal, and the gear body is formed by plastic molding process together with the counterweight and the crankpin.

3. The air compressor of claim 2, wherein the central axle of the counterweight of the rotating device is mounted to an axle hole of the main frame, so that the motor can drive the rotating device to rotate about the axle hole.

4. The air compressor of claim 3, wherein a pinion is fitted on an output axle of the motor, and the gear body of the rotating device is engaged with the pinion, so that the motor can drive the rotating device to have the piston body conduct reciprocating motion in the cylinder.

5. The air compressor of claim 4, wherein the gear body defines a central through hole, the counterweight is formed together with the gear body such that the central axle extends out of the central through hole of the gear body to be mounted to the axle hole of the main frame, so that the rotating device can rotate about the axle hole of the main frame.

6. The air compressor claim 5, wherein the counterweight is vertically divided into two integrally formed portions including an upper portion and a lower portion, the lower portion having a dimension greater than the upper portion to form an extension beyond the upper portion, the counterweight being provided at the bottom of the lower portion with two integrally formed steps, including a first step and a second step, wherein the first step is formed on the bottom of the lower portion, the second step is formed on the first step, and the central axle is formed on the second step, the counterweight defining at the bottom of the lower portion a first recess next to the central axle and defining a first through hole at the bottom of the first recess, the first and second steps defining a curved recess facing towards the first recess; the gear body defining at its top an integral inner space including an upper inner space and a lower inner space, wherein the upper inner space corresponds to the upper portion of the counterweight, the lower inner space corresponds to the lower portion of the counterweight, and the central through hole is defined at the bottom of the lower inner space and corresponds to the first step of the counterweight, the gear body further defining at the bottom of the lower inner space a second through hole to be aligned with the first through hole of the counterweight for allowing the crankpin to be fitted into the first and second through holes; wherein the counterweight is assembled into and formed together with the gear body by mating the upper portion, the low lower portion, and the first step of the counterweight respectively with the upper inner space, the lower inner space, and the central through hole, whereby the second step and the central axle of the counterweight extends out of the central through hole of the gear body to be mounted to the axle hole of the main frame.

7. The air compressor of claim 6, wherein the inner surface of the second through hole is provided with an annular protrusion, and the crankpin defines an annular groove at one end, corresponding to the annular protrusion; wherein the annular protrusion is engaged with the annular groove; the end of the crankpin, adjacent to the annular groove, is in flush with the bottom of the gear body while the other end of the crankpin extends out of the first through hole of the counterweight to be pivotally connected to the piston body.

8. The air compressor of claim 7, wherein the left half of the counterweight and the right half of the counterweight are in shape asymmetric about the common line, so that the left half has a weight different from the left right half.

9. The air compressor of claim 8, wherein the counterweight defines a second recess at the bottom of the lower portion; wherein if the rotating device is configured to rotate clockwise, the second recess is located substantially at the right half of the counterweight to reduce the weight of the right half, so that the left half is heavier than the right half to facilitate upstrokes of the piston body; if the rotating device is configured to rotate counterclockwise, the second recess is located substantially at the left half of the counterweight to reduce the weight of the left half, so that the right half is heavier than the left half to facilitate upstrokes of the piston body.

10. The air compressor of claim 7, wherein the left half of the counterweight and the right half of the counterweight are in shape symmetrical about the common line, and the counterweight defines a second recess at the bottom of the lower portion; wherein if the rotating device is configured to rotate clockwise, the second recess is located substantially at the right half of the counterweight to reduce the weight of the right half of the counterweight, so that the left half is heavier than the right half to facilitate upstrokes of the piston body; if the rotating device is configured to rotate counterclockwise, the second recess is located substantially at the left half of the counterweight to reduce the weight of the left half of the counterweight, so that the right half is heavier than the left half to facilitate upstrokes of the piston body.

* * * * *